United States Patent
Mutsuda et al.

(10) Patent No.: US 10,519,338 B2
(45) Date of Patent: Dec. 31, 2019

(54) LAMINAR RESIN POWDER AND PAINT CONTAINING SAME

(71) Applicant: DAICEL-EVONIK LTD., Tokyo (JP)

(72) Inventors: Mitsuteru Mutsuda, Himeji (JP); Hirofumi Iguchi, Himeji (JP); Ryo Nakahama, Himeji (JP); Kimihiko Oya, Himeji (JP)

(73) Assignee: DAICEL-EVONIK LTD., Tokyo (JP)

( * ) Notice: Subject to any disclaimer, the term of this patent is extended or adjusted under 35 U.S.C. 154(b) by 211 days.

(21) Appl. No.: 14/891,609

(22) PCT Filed: Jun. 6, 2014

(86) PCT No.: PCT/JP2014/065105
§ 371 (c)(1),
(2) Date: Nov. 16, 2015

(87) PCT Pub. No.: WO2014/208314
PCT Pub. Date: Dec. 31, 2014

(65) Prior Publication Data
US 2016/0083616 A1     Mar. 24, 2016

(30) Foreign Application Priority Data

Jun. 28, 2013 (JP) ................. 2013-136073

(51) Int. Cl.
C09D 7/40       (2018.01)
C09D 171/00     (2006.01)
B05D 3/02       (2006.01)
C08G 65/40      (2006.01)

(52) U.S. Cl.
CPC ......... *C09D 171/00* (2013.01); *B05D 3/0254* (2013.01); *C08G 65/4012* (2013.01); *C09D 7/40* (2018.01)

(58) Field of Classification Search
CPC ..... C09D 171/00; C09D 7/40; C08G 65/4012
See application file for complete search history.

(56) References Cited

U.S. PATENT DOCUMENTS

| 4,546,141 A | 10/1985 | Gebauer |
| 4,578,427 A | 3/1986 | Salto et al. |

(Continued)

FOREIGN PATENT DOCUMENTS

| EP | 0 100 889 A1 | 2/1984 |
| EP | 0 377 170 A2 | 7/1990 |

(Continued)

OTHER PUBLICATIONS

Zhang et al., "Tensile and tribological behaviors of PEEK/nano-SiO2 composites compounded using a ball milling technique," Composites Science and Technology, 68 (2008), pp. 3073-3080. (Year: 2008).*

(Continued)

*Primary Examiner* — Kara B Boyle
(74) *Attorney, Agent, or Firm* — Birch, Stewart, Kolasch & Birch, LLP (57) ABSTRACT

A resin powder containing an aromatic polyetherketone resin (e.g., a polyetheretherketone) is deformed into a plate-like form, and the resulting powder is used as a resin powder for a coating material. The plate-like resin powder may have an average thickness of, for example, not more than 2 μm. The coating material may contain a dispersing agent or may be dispersed in a dispersion medium, such as water. The coating material may particularly be used as a coating material for covering a metal substrate. The plate-like resin powder, which may comprise an aromatic polyetherketone resin, allows formation of a coating layer which has a high adhesion to a substrate and in which the generation of pinholes is efficiently prevented or reduced.

16 Claims, 2 Drawing Sheets

(56) References Cited

U.S. PATENT DOCUMENTS

| | | | |
|---|---|---|---|
| 5,247,052 A | 9/1993 | Lucke et al. | |
| 2013/0289175 A1 | 10/2013 | Liu | |

FOREIGN PATENT DOCUMENTS

| | | |
|---|---|---|
| JP | 58-127768 A | 7/1983 |
| JP | 60-155275 A | 8/1985 |
| JP | 63-303728 A | 12/1988 |
| JP | 2001-89624 A | 4/2001 |
| JP | 2004-27136 A | 1/2004 |
| JP | 2006-045490 A | 2/2006 |
| JP | 2013-23542 A | 2/2013 |
| JP | 2013-231098 A | 11/2013 |
| WO | WO 2008/044668 A1 | 4/2008 |

OTHER PUBLICATIONS

Hedayati et al., "Ball milling preparation and characterization of poly(ether ether ketone)/surface modified silica nanocomposite," Powder Technology, 207. (2011) pp. 296-303 (Year: 2011).*

International Search Report, issued in PCT/JP2014/065105, dated Aug. 12, 2014.

Extended European Search Report dated Jan. 16, 2017, in European Patent Application No. 14818094.6.

English translation of International Preliminary Report on Patentability and Written Opinion dated Jan. 7, 2016, in PCT International Application No. PCT/JP2014/065105.

* cited by examiner

LAMINAR RESIN POWDER AND PAINT CONTAINING SAME

TECHNICAL FIELD

The present invention relates to plate-like (or laminar) resin powders containing aromatic polyetherketone resins and also relates to coating materials containing the plate-like resin powders.

BACKGROUND ART

Metals have high strength and high modulus of elasticity and are being used in very wide technical fields. A metal is often coated for use so that the coating layer (or coat) may provide an identification color or prevent rust or make the touch soft or reduce the coldness of the metal. Representative coating techniques include a method that comprises dissolving a polymer component in a solvent, coating the resulting liquid, and then volatilizing the solvent to form a coating layer, like a paint; or a method that comprises inducing a crosslinking reaction of a polymer having a functional group, such as an isocyanate group, using water in air or other substances to form a coating layer.

An example of relatively new techniques is what is called a powder coating. The powder coating comprises allowing a polymer powder to directly adhere to a heated metal piece or allowing a polymer powder to electrostatically adhere to a metal piece or coating a metal piece with an emulsion containing a polymer powder; and then heat-melting the polymer powder to form a coating layer. The polymer to be used for the powder coating includes a polyamide 12, a special polyolefin, and others. The powder coating technique is being used for various applications ranging from big products, such as a water pipe or a water storage tank, to small products, such as a slide rail part for automobile, a shopping cart, and a hook of woman's underwear.

For the powder coating technique, characteristics of a coating layer depend in large measure on physical properties of a polymer constituting a powder. Thus a powder coating technique using a polymer that outperforms the conventional one has been studied and required.

The coating has a typical problem of separation of a coating layer and a metal. The separation is caused, for example, by the following phenomena: (1) rust formed due to water or others penetrating through the coating layer to enter a gap between the coating layer and the metal, (2) a stress produced on a boundary between the coating layer and the metal due to swelling of the coating layer by absorption of water or others, (3) fracture of the coating layer due to a physical force or a chemical agent, and (4) a stress produced on a boundary between the metal and the coating layer due to a difference in expansion coefficient when the temperature changes. The separation problem should be taken into consideration for powder coating. Any solution of this problem by powder coating with a new material will give an extremely significant technical meaning.

Against this background, the development of powder coating techniques using super engineering plastics has been studied. Among super engineering plastics, an aromatic polyetherketone resin, such as a polyetheretherketone (PEEK), has excellent heat resistance or chemical resistance and extremely high physical properties and is known as a material having prominent physical properties. The aromatic polyetherketone resin having the excellent properties can impart excellent surface characteristics to a metal coated with the resin. Not only that, the aromatic polyetherketone resin can form a promising strong coating layer on the separation problem that has not been solved by an existing coating polymer, because the resin has a low water absorption (against the above-mentioned phenomena (1) and (2)), a high kinetic property or a high chemical resistance (against the above-mentioned phenomenon (3)), and a high glass transition temperature (Tg) and a low coefficient of linear expansion (against the above-mentioned phenomenon (4)).

For example, WO2008/044668 (Patent Document 1) discloses a powder coating material containing a synthetic resin and an electrically conductive filler, wherein a polyetheretherketone may be used as the synthetic resin. The document discloses that in Examples a powder coating material containing a PEEK having an average particle diameter of 150 µm and a carbon precursor particle was actually spray-coated on a surface of a steel plate and baked at 385° C. for 20 minutes to form a coating layer.

As described above, use of the aromatic polyetherketone resin as a coating material is being attempted, while the aromatic polyetherketone resin has a difficulty in coating itself compared with an existing coating material. The difficulty probably results from an intermolecular strong cohesive force of the resin; the intermolecular strong cohesive force induces on the one hand excellent characteristics of the resin and on the other hand a high melt viscosity or a high thixotropy in melting.

In particular, for the aromatic polyetherketone resin, the melt viscosity characteristics of the resin make it difficult that the resin forms a good coating layer through a process necessary for forming a coating layer; the process comprises attaching the resin in the form of a powder to a surface of a metal and heating the resin for rapid melting and flowing. For the reasons, for example, what is called a pinhole phenomenon frequently occurs, and the phenomenon is quite difficult to solve. In particular, as suggested in Patent Document 1 (paragraph [0063]), such a tendency is markedly shown in a thinner coating layer.

RELATED ART DOCUMENTS

Patent Documents

Patent Document 1: WO2008/044668 (Claims, Examples)

SUMMARY OF THE INVENTION

Problems to be Solved by the Invention

It is an object of the present invention to provide a plate-like resin powder and a coating material containing the plate-like resin powder; the plate-like resin powder has a high adhesion to a substrate (a base material) even in a case where the resin powder contains an aromatic polyetherketone resin.

Another object of the present invention is to provide a plate-like resin powder and a coating material containing the plate-like resin powder; the plate-like resin powder forms a coating layer having an increased or improved surface smoothness.

It is still another object of the present invention to provide a plate-like resin powder and a coating material containing the plate-like resin powder; the plate-like resin powder forms a thin coating layer having no or less pinholes and possessing a high surface smoothness.

Means to Solve the Problems

The inventors of the present invention made intensive studies to achieve the above objects and finally found that deforming an aromatic polyetherketone resin particle (or a particle of an aromatic polyetherketone resin composition) into a plate-like form (e.g., by crushing) surprisingly allows the adhesion to a substrate, further the coatability (coat-formability), to be improved or increased, although the aromatic polyetherketone resin hardly forms a good coating layer as described above. In probable association with the improvement or increase, the inventors also found that the resulting coating layer has an improved surface smoothness, in particular, that even the coating layer having a small thickness (for example, a thickness of about not more than 30 μm) is uniform although pinholes are easily produced in a thin layer. The present invention was accomplished based on the above findings.

That is, an aspect of the present invention provides a plate-like (or laminar) resin powder (or resin particle) comprising an aromatic polyetherketone resin (for example, a polyetheretherketone).

The plate-like resin powder may have an average thickness (an average thickness determined from an electron micrograph) of, for example, not more than 2 μm. The plate-like resin powder may have a ratio of an average thickness and an average diameter (an average major axis) [a ratio of an average thickness and an average diameter (an average value of a major axis in a plane surface) determined from an electron micrograph] of about 1/3 to 1/50 in the former/the latter.

The plate-like resin powder may have a diameter (a diameter distribution) of about 1 to 300 μm determined by a light-scattering method, a diameter showing a maximum frequency of about 10 to 50 μm determined by a light-scattering method, and a proportion of the resin powder having a diameter showing the maximum frequency of not more than 8% determined by a light-scattering method.

The plate-like resin powder may be a powder obtainable by deforming a resin powder (a resin particle, a raw resin powder, a non-plate-like resin powder) comprising an aromatic polyetherketone resin into a plate-like form (or shape).

The plate-like resin powder may be used for a coating material, in particular, a coating material for covering a metal substrate [a coating material for metal coating (covering)].

Another aspect of the present invention provides a coating material comprising a resin powder (resin powder A), wherein the resin powder contains the plate-like resin powder (plate-like resin powder A1). For the coating material, the resin powder (resin powder A) may contain another resin powder (resin powder A2).

The coating material may contain a dispersing agent (for example, at least one member selected from the group consisting of a water-soluble polymer and a surfactant). In particular, the dispersing agent may comprise a nonionic surfactant. For the coating material containing the dispersing agent, the ratio of the dispersing agent may be, for example, about 0.5 to 30 parts by weight relative to 100 parts by weight of the resin powder.

For the coating material, the resin powder (the resin powder A) may be dispersed in a dispersion medium (in particular, a dispersion medium containing water (an aqueous dispersion medium)). In other words, the coating material may be a dispersion (emulsion) of the resin powder in the dispersion medium.

Another aspect of the present invention provides a coating layer (or a coat) formed from the coating material and a composite substrate having the coating layer. The composite substrate (the substrate covered with the coating material, the coated substrate) comprises a substrate and the coating layer (or a coat) on the substrate (a coating layer covering the substrate).

The substrate may particularly be a metal (or metallic) substrate. The coating layer may be a thin coating layer (or a thin film). For example, the coating layer may have a thickness (an average thickness) of not more than 30 μm.

A further aspect of the present invention provides a method for producing the composite substrate, comprising a step of coating (applying or painting) a substrate with the coating material. The method may further comprise a step of baking (heating) the coating material after the coating step.

Effects of the Invention

The plate-like resin powder of the present invention has a high adhesion to a substrate (a base material) although the resin powder contains an aromatic polyetherketone resin. In particular, surprisingly, the improvement of the adhesion is already seen immediately after the resin powder is coated (or applied). Thus, without any special surface treatment for a substrate (in particular, a substrate made of a metal) or before a baking treatment that is performed after coating, the plate-like resin powder of the present invention highly adheres to the substrate and has a highly improved coatability (coat-formability) or working efficiency. Specifically, the coating material (or the plate-like resin powder) of the present invention, even before being baked, closely adheres to the substrate at a level at which the coating material is not separated from the substrate by rubbing with a finger.

Moreover, the plate-like resin powder of the present invention allows the formation of a coating layer having an increased or improved smoothness (surface smoothness). In particular, the plate-like resin powder of the present invention allows the formation of a thin coating layer in which the generation of pinholes is prevented or highly reduced and which has a high surface smoothness although the resin powder contains an aromatic polyetherketone resin. Above all, on ground that the aromatic polyetherketone resin has a relatively high melt viscosity, the formation of a coating layer having such a high surface smoothness is an extremely unexpected result.

The reason why the adhesion or surface smoothness of the coating layer is improved is unknown. Part of the reason may be that the plate-like powders easily overlap one another in a scale-like shape on the substrate to form a coating layer having a laminated structure.

Further, the plate-like resin powder of the present invention is highly dispersed in a solvent (in particular, water or a dispersion medium containing water) although the resin powder contains an aromatic polyether resin having a high cohesive force. In addition, the resin powder maintains such a high dispersibility over a long period of time and also has an excellent dispersion stability (for example, sedimentation stability). Thus the plate-like resin powder of the present invention is suitably usable for various applications (in particular, a coating material) in the form of a dispersion in a solvent.

Since the plate-like resin powder of the present invention is in a plate-like form (or shape) having a small thickness, the whole powder is moderately bulky and the size thereof does not substantially differ from (or is larger, due to loose aggregation, than) that of the powder before deformation into a plate-like form. Thus the plate-like resin powder is easy to handle and has an excellent coat-formability. Compared with the usual resin powder, the plate-like resin powder easily forms a thin film (in particular, a thin film having no or less pinholes). Further, the plate-like resin powder has excellent characteristics as described above. Thus the plate-like resin powder of the present invention is of much practical use and has a high usefulness.

DESCRIPTION OF EMBODIMENTS

[Plate-Like Resin Powder]

The plate-like resin powder of the present invention comprises an aromatic polyetherketone resin and is in a plate-like (or laminar or flat or thin) form.

(Aromatic Polyetherketone Resin)

According to the present invention, the resin (or resin component) forming the plate-like resin powder comprises an aromatic polyetherketone resin.

The aromatic polyetherketone resin (or polyaryletherketone resin) usually comprises a repeating unit containing an arylene group, an ether group [—O—], and a carbonyl group [—C(=O)—]. The resin may contain a repeating unit without particular limitation, for example, a repeating unit represented by any one of the following formulae (a1) to (a5):

(a1)

(a2)

(a3)

(a4)

(a5)

wherein Ar represents a bivalent (or divalent) aromatic hydrocarbon ring group which may have a substituent.

The bivalent aromatic hydrocarbon ring group represented by Ar may include, for example, a $C_{6-10}$ arylene group [e.g., a phenylene group (such as o-, m-, or p-phenylene group) and a naphthylene group], a bi$C_{6-10}$arylene group [e.g., a biphenylene group (such as 2,2'-biphenylene group, 3,3'-biphenylene group, or 4,4'-biphenylene group)], and a ter$C_{6-10}$arylene group (such as o-, m-, or p-terphenylene group). These aromatic hydrocarbon ring groups may have a substituent; the substituent may include, for example, a halogen atom, an alkyl group (e.g., a straight- or branched-chain $C_{1-4}$alkyl group, such as methyl group), a haloalkyl group, a hydroxyl group, an alkoxy group (e.g., a straight- or branched-chain $C_{1-4}$alkoxy group, such as methoxy group), a mercapto group, an alkylthio group, a carboxyl group, a sulfo group, an amino group, an N-substituted amino group, and a cyano group. In the repeating units (a1) to (a5), the species of each Ar may be the same or different from each other.

A preferred Ar may include a phenylene group (e.g., p-phenylene group) and a biphenylene group (e.g., 4,4'-biphenylene group).

As a resin having the repeating unit (a1), there may be mentioned a polyetherketone (for example, "PEEK-HT" manufactured by Victrex), and others. A resin having the repeating unit (a2) may include a polyetherketoneketone (for example, "PEKK" manufactured by Arkema+Oxford Performance Material), and others. As a resin having the repeating unit (a3), there may be mentioned a polyetheretherketone (for example, "VICTREX PEEK" manufactured by Victrex, "Vestakeep (registered trademark)" manufactured by Evonik, "Vestakeep-J" manufactured by Daicel-Evonik Ltd., "Ketaspire (registered trademark)" manufactured by Solvay Advanced Polymers), a polyether-diphenyl-ether-phenyl-ketone-phenyl (for example, "Kadel (registered trademark)" manufactured by Solvay Advanced Polymers), and others. A resin having the repeating unit (a4) may include a polyetherketoneetherketoneketone (for example, "VICTREX ST" manufactured by Victrex), and others. As a resin having the repeating unit (a5), there may be mentioned a polyetheretherketoneketone, and others.

In the repeating unit containing an arylene group, an ether group, and a carbonyl group, the ratio (number ratio) of the ether segment (E) and the ketone segment (K) [the former/the latter (E/K)] is about 0.5/1 to 2/1 and preferably about 1/1 to 2/1. The ether segment imparts flexibility to the molecular chain and the ketone segment imparts stiffness to the molecular chain; thus a larger amount of the ether segment increases the crystallization rate and the ultimately reachable degree of crystallization, and a larger amount of the ketone segment tends to raise the glass transition temperature and the melting point.

Among the aromatic polyetherketone resins, a preferred resin includes an aromatic polyetherketone resin having any one of the repeating units (a1) to (a3), in particular, an aromatic polyetherketone resin (for example, a polyetheretherketone) having the repeating unit (a3) in view of excellent balance of a high glass transition temperature and melting point and a high crystallization rate.

The aromatic polyetherketone resins may be used alone or in combination.

The aromatic polyetherketone resin may be a commercially available product as described above or may be synthesized by a conventional method (for example, a nucleophilic substitution reaction, such as condensation of an aromatic diol component and an aromatic dihalide component, or self-condensation of an aromatic monohalide-monool component).

The aromatic diol component may include a dihydroxybenzene (such as hydroquinone), a dihydroxybenzophenone (such as 4,4'-dihydroxybenzophenone), and others. As the aromatic dihalide component, there may be mentioned a dihalobenzophenone (such as 4,4'-difluorobenzophenone or 4,4'-dichlorobenzophenone), and others. The aromatic monohalide-monool component may include a halo-hydroxybenzophenone (such as 4-fluoro-4'-hydroxybenzophenone), and others.

The condensation reaction may be carried out in the presence of a base and/or a solvent. Examples of the base may include an alkali metal salt, for example, an alkali metal carbonate, such as (anhydrous) potassium carbonate. The solvent may include a high-boiling solvent, for example, diphenylsulfone and sulfolane. The reaction temperature may be, for example, about 150 to 400° C. and preferably about 200 to 350° C.

The reaction product may be separated and purified by a conventional separation means, for example, filtration, concentration, crystallization, and chromatography. The reaction product may optionally be washed and dried. As a washing solvent, there may be mentioned water, alcohols (such as methanol or ethanol), ketones (such as acetone), and a mixed solvent thereof. A solid reaction product may be pulverized and/or classified for controlling the particle size.

In order to regulate the crystallization temperature or others, a terminal group (such as a halogen atom) of the reaction product may be modified with, for example, an alkali sulfonate group (such as lithium sulfonate group, sodium sulfonate group, or potassium sulfonate group).

The aromatic polyetherketone resin may have a number average molecular weight of, for example, not less than 5,000 (e.g., 5,000 to 1,000,000), preferably not less than 8,000 (e.g., 10,000 to 500,000), and more preferably not less than 15,000 (e.g., 20,000 to 100,000) in terms of polystyrene in a gel permeation chromatography (GPC). The aromatic polyetherketone resin having such a molecular weight is easy to deform into a plate-like form.

The aromatic polyetherketone resin (for example, the polyetheretherketone) may have a glass transition temperature (Tg) of, for example, not lower than 100° C. (e.g., about 120 to 250° C.), preferably about 120 to 200° C. (e.g., about 130 to 190° C.), and more preferably about 140 to 180° C.

Moreover, the aromatic polyetherketone resin (for example, the polyetheretherketone) may have a melting point of, for example, not lower than 300° C., preferably about 310 to 400° C., and more preferably about 320 to 380° C.

The glass transition temperature and the melting point can be measured by, for example, a differential scanning thermal analysis (DSC).

The melt viscosity of the aromatic polyetherketone resin is not particularly limited to a specific one. For use as a coating material or the like, it is sometimes preferred that the resin have a moderate viscosity. In particular, according to the present invention, the deformation of a resin powder into a plate-like form and the selection of a suitable melt viscosity of the resin can synergistically improve the adhesion of the plate-like resin powder to a substrate.

From such a viewpoint, the aromatic polyetherketone resin may have a melt viscosity at a temperature of 380° C. and a shear rate of $36.48^{-1}$ s of, for example, about 100 to 3000 Pa·s, preferably about 150 to 2500 Pa·s, more preferably about 180 to 2000 Pa·s, and particularly about 200 to 1900 Pa·s. The melt viscosity can be measured using a conventional apparatus, for example, a capillary rheometer.

(Other Resins)

The resin component forming the plate-like resin powder at least comprises the aromatic polyetherketone resin. For example, the plate-like resin powder may comprise the aromatic polyetherketone resin alone, or may further comprise other resins (resin components) as far as the effects of the present invention are not damaged. Other resins (resins other than the aromatic polyetherketone resin) may include, but should not be limited to, for example, a thermoplastic resin. The thermoplastic resin may include, for example, a resin classified as an engineering plastic (in particular, a super engineering plastic), such as a polyarylate (PAR), a liquid crystal polyester (or liquid crystal polymer, LCP), an aromatic polyamide [e.g., a semiaromatic polyamide (e.g., a polyamide having an aromatic dicarboxylic acid unit or an aromatic diamine unit as a monomer unit) and a fully aromatic polyamide], an aromatic polyetherketone resin, a polysulfone (PSU), a polyethersulfone (PES), a polyimide (PI), a polyamideimide (PAI), a polyetherimide (PEI), a poly(phenylene sulfide) (PPS), poly(ketone sulfide), or a polybenzimidazole (PBI). Other resins as described above may be used alone or in combination.

In a case where the resin powder comprises other resins, the proportion of the aromatic polyetherketone resin in the whole resin forming the plate-like resin powder may be not less than 50% by weight, preferably not less than 70% by weight, more preferably not less than 80% by weight, and particularly not less than 90% by weight.

(Additive)

If necessary, the plate-like resin powder may contain an additive as far as the effects of the present invention are not damaged. The additive can suitably be selected as usage, for example, may include a stabilizer (e.g., a heat stabilizer, a light stabilizer, and an antioxidant), a filler [e.g., an inorganic filler, such as a glass fiber, a glass powder, a carbon fiber, a carbon powder, a carbon nanotube, a metal oxide (such as aluminum oxide, titanium oxide, or zinc oxide), or a metal nitride (such as aluminum nitride or boron nitride)], a plasticizer, a lubricant, and a coloring agent. These additives may be used alone or in combination. The proportion of the additive in the plate-like resin powder may be not more than 50% by weight (e.g., about 0.01 to 50% by weight), preferably not more than 10% by weight (e.g., about 0.1 to 10% by weight).

(Form of Plate-Like Resin Powder)

As far as the resin powder of the present invention has a plate-like (flat-plate or platelet) form, the face (or the plane surface) of the resin powder is not particularly limited to a specific form. The face form may be either an isotropic form or an anisotropic form; the isotropic form may include, for example, a substantially circular form or a regular polygonal form (such as a substantially square form)], and the anisotropic form may include, for example, a substantially an elliptical form, a polygonal form (such as a substantially rectangular form), and an amorphous form.

The plate-like resin powder may be in a collapsed or compressed form. Such a plate-like resin powder may have an average thickness of, for example, not more than 3 μm (e.g., about 0.05 to 2.5 μm), preferably not more than 2 μm (e.g., about 0.1 to 1.8 μm), more preferably not more than 1.5 μm (e.g., about 0.15 to 1.3 μm), particularly not more than 1.2 μm (e.g., about 0.2 to 1.2 μm), and particularly preferably not more than 1 μm (e.g., about 0.3 to 0.9 μm), and usually about 0.1 to 2 μm (e.g., about 0.3 to 1.8 μm and preferably about 0.5 to 1.6 μm). Due to such a relatively small thickness the plate-like resin powder of the present invention easily forms a thin film.

The average thickness can be determined by non-limiting means, for example, from an electron micrograph. Specifically, the thickness (maximum thickness) of each of a plurality of resin powders randomly extracted (sampled) from an electron micrograph may be measured, giving the average of the resulting thickness values as the average thickness. The number of the resin powders extracted is, for example, not less than 10 (e.g., about 15 to 100, preferably about 20 to 50, and more preferably about 30.

The plate-like resin powder may have an average diameter [or an average major axis, an average of a length (maximum length or major axis) in a face (plane surface) direction (or a direction perpendicular to the thickness direction)] selected from the range of about 1.5 to 500 μm (e.g., about 2 to 300 μm). For example, the resin powder may have an average diameter of about 3 to 200 μm, preferably about 4 to 150 μm, more preferably about 5 to 100 μm (e.g., about 6 to 70 μm), and usually about 3 to 50 μm (e.g., about 4 to 40 μm, preferably about 5 to 30 μm, more preferably about 6 to 25 μm, and particularly about 7 to 20 μm).

The average diameter (average major axis) can be determined by non-limiting means, for example, from an electron micrograph in the same manner as the average thickness. Specifically, the diameter or length (maximum diameter or maximum length or major axis) of each of a plurality of plate-like resin powders randomly extracted (sampled) from an electron micrograph may be measured, giving the average of the resulting diameter or length values as the average diameter (or average length or average major axis). The number of the resin powders extracted is, for example, not less than 10 (e.g., about 15 to 100, preferably about 20 to 50, and more preferably about 30).

For the plate-like resin powder, the ratio of the average thickness relative to the average diameter (or average major axis) (the former/the latter) may be, for example, about 1/2 to 1/200 (e.g., about 1/2.5 to 1/150), preferably about 1/3 to 1/100, and more preferably about 1/4 to 1/80 (e.g., 1/5 to 1/60) or may usually be about 1/2 to 1/50 (e.g., about 1/2.5 to 1/30, preferably about 1/3 to 1/25, more preferably about 1/3.5 to 1/20, and particularly about 1/5 to 1/15). The average thickness and the average diameter to be used in the ratio may be the values measured as described above.

For a plate-like resin powder having an anisotropic face form, the ratio of a major axis relative to a minor axis in the face form (the major axis/the minor axis, the aspect ratio) can be selected from the range of about 1 to 100 or may be, for example, about 1 to 10, preferably about 1 to 5, and more preferably about 1 to (particularly about 1 to 1.5).

The diameter of the plate-like resin powder or the diameter distribution thereof can be determined (measured) by a light-scattering (dynamic light-scattering) method. For example, the diameter (the diameter distribution) of the plate-like resin powder determined by a light-scattering method may be, for example, about 0.01 to 700 µm (e.g., about 0.05 to 600 µm), preferably about 0.1 to 500 µm (e.g., about 0.3 to 400 µm), more preferably about 0.5 to 300 µm (e.g., about 0.8 to 250 µm) or may be about 1 to 300 µm.

The plate-like powder may have a diameter showing the maximum frequency (a diameter of the highest-frequency particle) determined by a light-scattering method of, for example, about 0.5 to 100 µm, preferably about 1 to 80 µm, more preferably about 3 to 60 µm (e.g., about 5 to 50 µm) and particularly about 10 to 50 µm (e.g., about 15 to 30 µm).

The proportion of the plate-like resin powder having a diameter showing the maximum frequency determined by a light-scattering method may be, for example, about 1 to 20%, preferably about 1.5 to 15%, and more preferably about 2 to 12% (e.g., about 3 to 10%) or may usually be not more than 12% [for example, about 1 to 12%, preferably not more than 10% (e.g., about 2 to 10%), and more preferably not more than 8% (e.g., about 3 to 8%)].

In particular, as described later, the plate-like resin powder of the present invention may be a powder obtainable by deforming a plurality of resin particles (an aggregate of resin particles, or an agglomerated resin particle; hereinafter may simply be referred to as a resin particle) into a plate-like form.

For the powder, usually, the resin particle (each resin particle, single resin particle) comprising the aromatic polyetherketone resin may independently be deformed into a plate-like form (or may have a plate-like form). According to the resin powder of the present invention, a plurality of plate-like resin particles may be aggregated or agglomerated (or laminated or stacked). The resin particles usually have a weak cohesive force and are practically separated easily in synthesis or in use.

(Method for Producing Plate-Like Resin Powder)

The method for producing the plate-like resin powder (plate-like resin particle) of the present invention may include, but should not be limited to, for example, (A) a method of deforming a raw resin powder (a resin powder that has not been deformed into a plate-like form (non-plate-like resin powder)) into a plate-like form (or a plate-like powder) and (B) a method of pulverizing (or crushing) a film (or a sheet or a film-like product) composed of a resin (or a resin composition). According to the present invention, in particular, the method (A) can preferably be used. In the method (A), it is not necessary to form a film, and a powder having relatively less variation in size (thickness or particle diameter) is efficiently obtainable.

For the method (A), the raw resin powder (or raw resin particle) to be used may include, but should not be limited to, for example, a resin powder immediately after polymerization (non-pelletized powder or particle), and a powder (or particle) obtainable by pulverizing (e.g. freeze-pulverizing) a pellet resin (or resin composition).

The average particle diameter (or size) of the raw resin powder (a resin powder before deformation into a plate-like form) can be selected from the range of about 0.1 to 500 µm and may be, for example, about 0.2 to 300 µm (e.g., about 0.3 to 200 µm), preferably about 0.5 to 100 µm (e.g., about 1 to 70 µm), more preferably about 2 to 50 µm (e.g., about 3 to 40 µm), and usually about 4 to 30 µm (e.g., about 5 to 30 µm). In particular, the raw resin particle may have an average particle diameter of not more than 50 µm, preferably not more than 30 µm, and more preferably not more than 20 µm. The raw resin particle having such a particle diameter is easy to deform into a plate-like form efficiently.

For the raw resin powder being in a non-spherical form (for example, an anisotropic form, such as a substantially ellipsoidal form, a substantially cylindrical form, or a substantially polyangular prismatic form), the raw resin powder may have an aspect ratio [a ratio of a major axis (an average major axis) and a minor axis (an average minor axis)] of, for example, less than 2 (e.g., about 1.01 to 1.9) and preferably about 1.05 to 1.8 (e.g., about 1.1 to 1.5). It is preferred that the raw resin powder be in a substantially spherical form having a small aspect ratio.

For the method (A), the method of deforming the resin powder into a plate-like form may include, but should not be limited to, crushing (collapsing) the raw resin powder (in particular, the raw resin particle). According to the present invention, a plate-like product is obtainable surprisingly without cracks by crushing the raw resin powder (or raw resin particle). For the method, various apparatuses or means that can crush the raw resin powder by a physical force (an apparatus or means for deformation into a flat form) is utilizable. The apparatus or means may include a mill (a media dispersing machine), a roll [such as a mill roll (such as a two-roll mill or a three-roll mill)], and a media-less dispersing machine [for example, a high-pressure collision dispersing machine (such as a nanomizer or an artimizer) and an ultrasonic dispersing machine].

Among them, the mill is user-friendly due to relatively excellent operationality.

The mill (media mill) is classified broadly into two groups: what is called a wet media mill and a dry media mill; the wet media mill uses a medium including a liquid, and the dry media mill does not use a liquid. According to the present invention, both media mills are available.

The wet media mill may include a ball mill, a side grinder, a dyno mill, a spike mill, a DCP mill, a basket mill, and a paint conditioner. The dry media mill may include a ball mill, a vibrating ball mill, an attritor, and a dry bead mill.

The material of a container to be used for the media mill may include, but should not be limited to, a hardened steel, a stainless steel, a SUS chrome plating, an alumina ceramic, a silicon nitride ceramic, a zirconia ceramic, a silicon carbide ceramic, a zirconia-toughened alumina ceramic, and a Sialon.

As a media particle to be used for the media mill, there may usually be employed a particle having a spherical form (shape). The material of the media particle may include a glass bead, a low-alkali glass bead, a no-alkali glass bead, an alumina bead, a zirconia bead, a zirconia yttria bead, a titania bead, a high-purity alumina bead, and a steel ball. The media particle (bead) may have a specific gravity of, for example, not less than 2.0, preferably not less than 2.5, and more preferably not less than 3.0.

The size of the media particle (bead) can suitably be selected according to the size of the resin particle to be subjected to deformation into a plate-like form, or other factors. The media particle (bead) may have a size of, for example, about 0.05 to 5 mm (e.g., about 0.1 to 3 mm).

For the wet media mill, water may usually be employed as the media (liquid). The media (liquid) to be used may also include a mixed solvent containing water and an aqueous solvent [or a water-soluble solvent, for example, an alcohol (an alkanol, such as methanol, ethanol, or isopropyl alcohol; a diol, such as 1,2-pentanediol or 1,2-hexanediol), a diol monoether (e.g., an alkylene glycol monoalkyl ether, such as ethylene glycol monomethyl ether or propylene glycol monobutyl ether; and a polyalkylene glycol monoalkyl ether, such as diethylene glycol monoethyl ether or triethylene glycol monobutyl ether)]. The aqueous solvents may be used alone or in combination.

The plate-like resin powder is obtainable as described above. In a case where the plate-like resin powder is produced by the wet method, the plate-like resin powder may be used in the form of a composition containing a medium (that is, as a dispersion of the plate-like resin powder in a medium) for various applications (e.g., a coating material).

[Coating Material]

The plate-like resin powder of the present invention can be used for various applications, particularly, can suitably be used for a coating material (a coating agent). Hereinafter, the coating material will be explained in detail.

The coating material (coating agent) contains the plate-like resin powder (plate-like resin particle) of the present invention as a coating component. In other words, the plate-like resin powder of the present invention can be used as a resin powder for coating (powder coating).

The coating component (resin powder) in the coating material (powder coating material) comprises the plate-like resin powder of the present invention. That is, the resin powder (resin powder A) in the coating material may comprise the plate-like resin powder (plate-like resin powder A1) of the present invention alone, or if necessary, may comprise another resin powder (resin powder A2) as far as the effects of the present invention are not damaged. As the plate-like resin powder A1 of the present invention, two or more different plate-like resin powders may be used. For example, two or more plate-like resin powders with different thickness may be used in combination, or two or more plate-like resin powders different in kind may be used in combination.

The resin powder A2 may include a resin powder (plate-like or non-plate-like resin powder) composed of a resin other than an aromatic polyetherketone resin, and a non-plate-like resin powder (a resin powder that is not in a plate-like form) composed of an aromatic polyetherketone resin. The resin powder A2 may representatively comprise a non-plate-like resin powder composed of an aromatic polyetherketone resin. Combination use of the plate-like resin powder A1 and the non-plate-like resin powder can provide an efficient regulation of a thickness of a coating layer. For example, for the formation of a coating layer having a thickness larger than that of the plate-like resin powder, combination use of the plate-like resin powder A1 and a non-plate-like powder having a particle diameter (or thickness) larger than the thickness of the coating layer achieves the effects of the present invention (e.g., excellent adhesion, smoothed coating layer, and no or less pinholes) and enables a coating layer having a desired thickness to be formed efficiently.

The non-plate-like resin powder (the non-plate-like resin powder composed of the aromatic polyetherketone resin) may include the raw resin powder (or raw resin particle) described in the method (A). For example, the particle diameter (average particle diameter) of the non-plate-like resin powder can suitably be selected according to the thickness of the coating layer, or other factors. For example, the non-plate-like resin powder may have a particle diameter (an average particle diameter) of about 1 to 500 μm (e.g., about 2 to 200 μm), preferably about 3 to 100 μm, more preferably about 5 to 80 μm (e.g., about 8 to 50 μm).

For the non-plate-like resin powder being in a non-spherical form (for example, an anisotropic form, such as a substantially ellipsoidal form, a substantially cylindrical form, or a substantially polyangular prismatic form), the non-plate-like resin powder may have an aspect ratio [a ratio of a major axis (average major axis) and a minor axis (average minor axis)] of, for example, less than 2 (e.g., about 1.01 to 1.9) and preferably about 1.05 to 1.8 (e.g., about 1.1 to 1.5). It is preferred that the non-plate-like resin powder be in a substantially spherical form having a small aspect ratio.

For the use of the resin powder A2, the ratio of the plate-like resin powder A1 of the present invention relative to the resin powder A2 [the former/the latter (weight ratio)] may be about 99/1 to 5/95 (e.g., about 98/2 to 10/90), preferably about 97/3 to 20/80 (e.g., about 96/4 to 30/70), and more preferably about 95/5 to 40/60 (e.g., 93/7 to 50/50) or may usually be about 99/1 to 50/50 (e.g., about 97/3 to 60/40 and preferably about 95/5 to 65/35).

The coating material may contain an additive in addition to the resin powder A as a coating component. The additive may include the above-mentioned additives, and, for example, a leveling agent, a viscosity modifier, a defoaming agent, and a dispersing agent. The additives may be used alone or in combination.

In particular, according to the present invention, the dispersing agent may suitably be used as the additive. The plate-like resin powder of the present invention is dispersible in a dispersion medium (e.g., water) without a dispersing agent. Surprisingly, in cooperation with the deformation of the resin powder into a plate-like form, use of the dispersing agent tends to further increase or improve the formability of the coating layer. For example, use of a surfactant probably allows the plate-like resin powders to be easily laid on another in layers, thus ensuring to form a uniform coating layer efficiently.

The dispersing agent may include, for example, a water-soluble polymer and a surfactant. The dispersing agents may be used alone or in combination.

The water-soluble polymer may include, for example, a natural polymer or a derivative thereof and a synthetic polymer (or a derivative thereof). Examples of the natural polymer or the derivative thereof may include a cellulose derivative (e.g., a cellulose ether, such as a methyl cellulose, a hydroxyethyl cellulose, an ethylhydroxyethyl cellulose, a hydroxypropylmethyl cellulose, a hydroxypropyl cellulose, a carboxymethyl cellulose, or a salt thereof; and a viscose), a salt of alginic acid, a gelatin, an albumin, a casein, a rubber (such as an gum acacia (or gum arabic) or a tragacanth gum), a lignin sulfonate, and a starch derivative (such as a hydroxyalkyl starch, a starch acetate, a crosslinked starch, a dextrin, a cationic starch, a starch phosphate, or a salt of a carboxymethyl starch). Examples of the synthetic polymer (or a derivative thereof) may include a polymer having (meth)acrylic acid as a monomer unit or a salt of the polymer [e.g., a polyacrylic acid, a (meth)acrylate-(meth)acrylic acid copolymer, a vinylnaphthalene-(meth)acrylate copolymer, a styrene (or α-methylstyrene)-(meth)acrylic acid copolymer, or a salt thereof], a polymer having itaconic acid as a monomer unit or a salt of the polymer [e.g., an itaconate-itaconic acid copolymer, a styrene (or α-methylstyrene)-itaconic acid copolymer, a vinylnaphthalene-itaconic acid copolymer, or a salt thereof], a polymer having maleic acid as a monomer unit or a salt of the polymer [e.g., a styrene (or α-methylstyrene)-maleic acid copolymer, or a salt thereof], a vinyl alcohol-series polymer [e.g., a poly(vinyl alcohol), a vinyl alcohol-vinyl acetate copolymer, a partially formalized poly(vinyl alcohol), and a partially butyralized poly(vinyl alcohol)], a vinylpyrrolidone-seires polymer (e.g., a polyvinylpyrrolidone and a vinylpyrrolidone-vinyl acetate copolymer), a vinyl ether-series polymer [e.g., a poly(vinyl methyl ether)], a poly(alkylene oxide) [e.g., a poly(ethylene oxide), a poly(ethylene glycol), and a poly(propylene glycol)], a homo- or co-polymer of acrylamide (e.g., a polyacrylamide), a poly(vinyl sulfate), a poly(4-vinylpyridine) salt, a polyamide, a polyallylamine salt, a condensed naphthalene sulfonate, and a polyaminesulfone.

The water-soluble polymers may be used alone or in combination.

The surfactant may include an anionic surfactant, a cationic surfactant, an ampholytic surfactant, and a nonionic surfactant. Examples of the anionic surfactant may include a salt of a carboxylic acid, an alkyl sulfonate, a modified alkyl sulfonate, an alkylallyl sulfonate, an alkyl sulfate salt, a sulfated oil, a sulfate ester, a sulfated fatty acid monoglyceride, a sulfated alkanolamide, a sulfated ether, an alkyl phosphate salt, a salt of an alkyl benzene phosphonic acid, and a naphthalene sulfonate formaldehyde condensate. Examples of the cationic surfactant may include an amine salt, a modified amine salt, a tetraalkyl quaternary ammonium salt, a modified trialkyl quaternary ammonium salt, a trialkylbenzyl quaternary ammonium salt, a modified trialkylbenzyl quaternary ammonium salt, an alkyl pyridinium salt, a modified alkyl pyridinium salt, an alkyl quinolinium salt, an alkyl phosphonium salt, and an alkyl sulfonium salt. Examples of the ampholytic surfactant may include a betaine and a sulfobetaine. Examples of the nonionic surfactant may include a glycerin fatty acid ester, a polyglycol fatty acid ester, a sorbitan fatty acid ester, a sucrose fatty acid ester, a fatty acid alkanolamide, an ethylene oxide adduct of a fatty acid, an ethylene oxide adduct of a fatty acid amine, an ethylene oxide adduct of a fatty acid mercaptan, and an acetylene alcohol-series compound [e.g., an acetylenediol-series compound, such as an acetylenediol (e.g., 2,4,7,9-tetramethyl-5-decyne-4,7-diol) or an alkylene oxide adduct of acetylenediol)].

The surfactants may be used alone or in combination.

Among these dispersing agents, a surfactant is preferred. In particular, a nonionic surfactant may preferably be used. Combination use of the dispersing agent and the plate-like resin powder containing the aromatic polyetherketone resin is preferred in light of the improvement in coat-formability or the reduction of discoloration arising from high-temperature baking.

The ratio of the dispersing agent can suitably be selected according to the kind of the dispersing agent or other factors. For example, the ratio of the dispersing agent relative to 100 parts by weight of the plate-like resin powder may be about 0.001 to 100 parts by weight (e.g., about 0.005 to 50 parts by weight), preferably about 0.01 to 30 parts by weight (e.g., about 0.02 to 25 parts by weight), and more preferably about 0.05 to 20 parts by weight (e.g., about 0.1 to 15 parts by weight) or may usually be about 0.5 to 30 parts by weight (e.g., about 1 to 20 parts by weight and preferably about 3 to 15 parts by weight).

The ratio of the dispersing agent relative to 100 parts by weight of the total amount of the plate-like resin powder and the dispersion medium (the after-mentioned dispersion medium, such as water) may be, for example, about 0.005 to 40 parts by weight, preferably about 0.01 to 30 parts by weight, and more preferably about 0.05 to 20 parts by weight (e.g., about 0.1 to 15 parts by weight).

In a case where the dispersing agent is a water-soluble polymer, the ratio of the dispersing agent may particularly be about 0.01 to 20 parts by weight relative to 100 parts by weight of the total amount of the plate-like resin powder and the dispersion medium. In a case where the dispersing agent is a surfactant, the ratio of the dispersing agent may particularly be not more than 10 parts by weight (e.g., about 0.01 to 8 parts by weight, preferably about 0.05 to 5 parts by weight, and more preferably about 0.1 to 3 parts by weight) relative to 100 parts by weight of the total amount of the plate-like resin powder and the dispersion medium.

The coating material may contain a dispersion medium. In other words, the coating material may contain the plate-like resin powder dispersed in a dispersion medium (the coating material may be in the form of an emulsion containing the plate-like resin powder dispersed in a dispersion medium). The dispersion medium is not particularly limited to a specific one as far as the plate-like resin powder can be dispersed in the dispersion medium. As the dispersion medium, water can preferably be used. The dispersion medium may be a mixed solvent containing water and other solvents (for example, the above-exemplified aqueous solvent, such as an alcohol). Other solvents may be used alone or in combination.

For the coating material contains the dispersion medium, the ratio of the dispersion medium can suitably be selected according to a purpose or a desired coating layer thickness. The ratio of the dispersion medium relative to 1 part by weight of the plate-like resin powder may be, for example, about 0.1 to 1000 parts by weight (e.g., about 0.3 to 500 parts by weight), preferably about 0.5 to 300 parts by weight, more preferably about 1 to 100 parts by weight (e.g., about 1.5 to 80 parts by weight), and particularly about 2 to 50 parts by weight (e.g., about 3 to 40 parts by weight) or may usually be about 2 to 50 parts by weight (e.g., about 5 to 30 parts by weight and preferably about 10 to 25 parts by weight).

The coating material (dispersion or plate-like resin powder) of the present invention may have thixotropic properties (thixotropy).

The coating material of the present invention can form a coating layer on a substrate (a substrate to be applied, a substrate to be coated). Thus the present invention also includes the coating layer and the substrate having the coating layer formed thereon [specifically, a composite substrate (a substrate covered with a coating material, a coated substrate) comprising a substrate and a coating layer (a coating layer for covering the substrate) containing the coating material and being formed on the substrate)].

The material of the substrate [or a surface (or site) to be coated of the substrate] may include, for example, a metal [e.g., aluminum, iron, titanium, nickel, and an alloy (stainless steel)], a ceramic (e.g., a glass), a plastic, and a wood. According to the present invention, in particular, a metal substrate (a substrate made of a metal) may preferably be used. In other words, since the coating material of the present invention comprises the aromatic polyetherketone resin, which can proof against a severe condition (such as a high temperature or a high pressure), the coating material may particularly preferably used as a coating (or covering) material for a metal.

The substrate (or a surface to be coated of the substrate) may be surface-treated (e.g., blast-treated) if necessary.

The coating layer (or the composite substrate) can be obtained by a production method that comprises a step of coating (applying or painting) the substrate with the coating material.

The coating method (the method of forming the coat) can be selected according to the state of the coating material (e.g., the presence or absence of a dispersion medium). For example, the coating method may include spraying (blasting), electrostatic coating, and fluidized-bed coating.

For a desired thickness of the coating layer or other factors, the coating material may be applied (or coated) a plurality of times.

After coating, if necessary, the coating layer may be subjected to a drying step (or a drying treatment) or a baking step (or a baking treatment or a heat treatment). In the baking treatment, the heating temperature of the coating layer can suitably be selected according to the resin contained in the plate-like resin powder. The heating temperature of the coating layer may be, for example, about 300 to 500° C., preferably about 320 to 450° C., and more preferably about 350 to 400° C. The time of the baking treatment is not particularly limited to a specific one, and may be, for example, about 30 seconds to 30 minutes [e.g., about 1 to 25 minutes (e.g., about 2 to 20 minutes) and preferably about 3 to 15 minutes (e.g., about 5 to 12 minutes)].

The thickness (average thickness) of the coating layer can be selected according to the coating method, the proportion of the resin component in the coating material, and others. For example, the thickness of the coating layer may be about 0.5 to 2000 μm (e.g., about 1 to 1500 μm), preferably about 2 to 1000 μm (e.g., about 3 to 800 μm), and more preferably about 5 to 500 μm (e.g., about 10 to 300 μm).

In particular, for the coating layer having a small thickness, the coating layer may be a thickness of not more than 100 μm (e.g., about 1 to 70 μm), preferably not more than 50 μm (e.g., about 2 to 40 μm), and more preferably not more than 30 μm (e.g., about 5 to 25 μm) or may usually have a thickness of about 1 to 40 μm (e.g., about 3 to 30 μm and preferably about 5 to 20 μm).

EXAMPLES

The following examples are intended to describe this invention in further detail and should by no means be interpreted as defining the scope of the invention. Measurement methods of physical properties are as follows.

(Average Thickness and Average Diameter of Plate-Like Resin Powder)

A sample (9.5 g) was washed with 2 L distilled water three times, filtered, and dried by a vacuum dryer.

The powder adhering on the filter was sampled (collected) at random three points on the filter by a spatula and placed on an observation table. Gold was deposited onto the sample placed on the observation table.

The resulting sample was measured and observed in a 3D mode at prescribed magnifications (1000, 2000, 3000, and 5000 magnifications) by a scanning electron microscope (SEM) VE-8800 manufactured by KEYENCE Corporation.

From the resulting electron micrograph, 60 particles in the observation field were randomly selected (30 particles which were easy to measure in the thickness direction, and 30 particles which were easy to measure in the longitudinal direction (plate surface direction)). The thickness (the maximum thickness) or the diameter (the maximum length in the longitudinal direction) of each particle was measured by an analysis mode.

For particles before deformation into a plate-like form (or non-plate-like particles), the major axis and minor axis were measured.

In some cases, the plate-like particles were apparently aggregated under the above-mentioned measurement conditions, and the thickness or diameter of each particle was hard to measure. Thus the magnification was suitably selected to facilitate the measurement.

(Diameter (or Diameter Distribution) of Plate-Like Resin Powder)

A sample was dispersed in water, and the diameter (diameter distribution) of the sample was measured by a laser diffraction/scattering particle diameter distribution measuring apparatus (LA920, manufactured by Horiba, Ltd.).

(Number of Pinholes)

The numbers of pinholes in an area within one centimeters around at the middle of the coating layer was counted by visual observation.

(Surface Smoothness)

The whole coating layer was visually observed, and the surface smoothness was evaluated on the basis of the following criteria.

A: There is no or little unevenness, and the whole surface of the coating layer is uniform.
B: There is little unevenness.
C: There is much unevenness.
D: There is extremely much unevenness.

Example 1

A non-plate-like PEEK powder "a" ("VESTAKEEP 2000UFP-20" manufactured by Daicel-Evonik Ltd., melt viscosity (380° C., shear rate of 36.48 $s^{-1}$): 790 Pa·s) was dispersed in water in a proportion of 10% by weight, and in this state the particle was crushed by a ball mill to give a plate-like powder. As the media species of the ball mill for this process, a high-purity alumina bead (particle diameter: 0.5 mm) was used. The volume of the dispersion and that of the media were the same.

Figure 1:
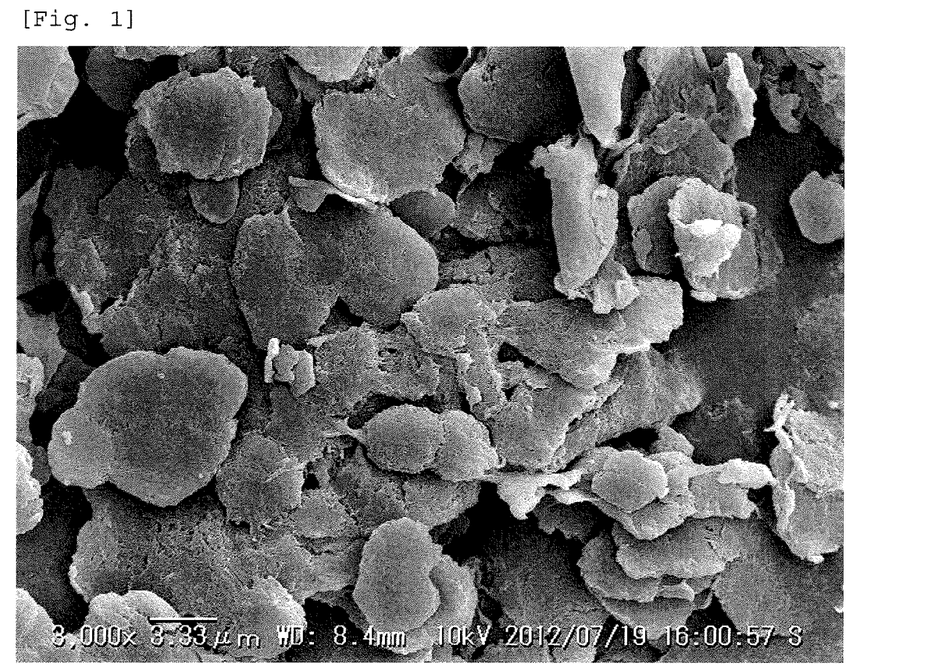
FIG. 1 is an electron micrograph of a plate-like resin powder obtained in Example 1.

The electron micrograph (3000 magnifications) of the resulting plate-like powder "A" is shown in FIG. 1.

The plate-like powder "A" had an average thickness of 0.8 μm, an average diameter of 8.0 μm (i.e., the average thickness/the average diameter=10.0), a diameter distribution of 2.2 to 210.0 μm, a diameter showing the maximum frequency (or a mode diameter) of 20 μm, and a proportion of the powder having a diameter showing the maximum frequency of 6.5%.

The resulting plate-like powder "A" was dispersed in water in a proportion of 3% by weight to give a dispersion. In the dispersion, the plate-like powder was uniformly dispersed. When the dispersion was allowed to stand, the sedimentation of the plate-like powder was not observed.

The resulting dispersion was sprayed on the whole surface of one side of a stainless steel (SUS420) plate (10 cm square) so as to give a coating layer having a thickness of 20 µm. Before the spraying, the stainless steel plate had been blast-treated and degreased. After the spraying, liquid dripping did not occur.

After the spraying, the coating layer was dried at 80° C. for 15 minutes for evaporation of water. The dried coating layer adhered to the stainless steel plate without separation by rubbing with a finger.

Figure 2:
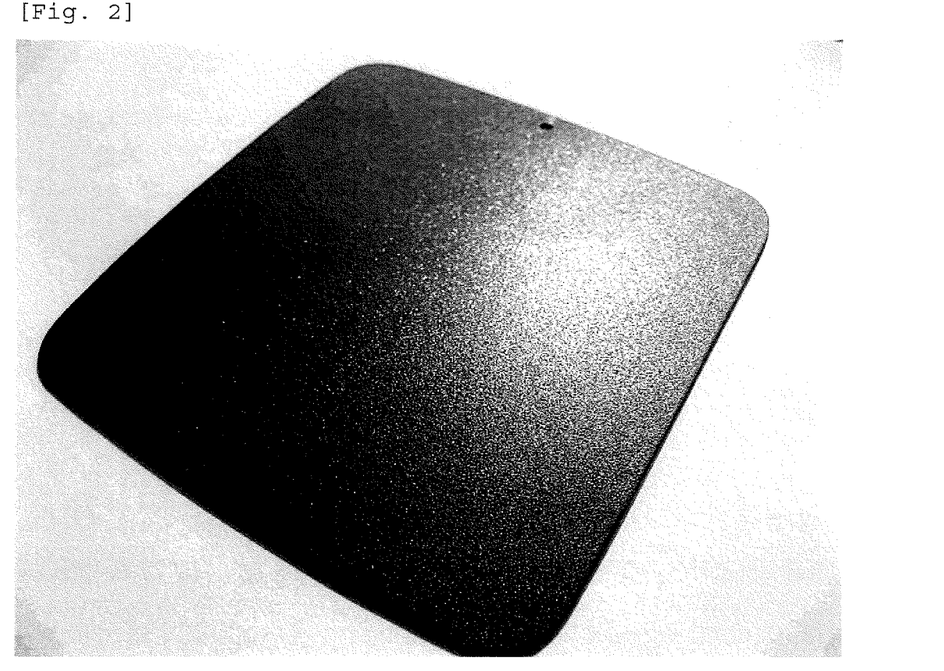
FIG. 2 is a photograph of a coating layer (a baked coating layer) obtained in Example 1.

The dried coating layer was heated at 380° C. for 10 minutes to give a baked coating layer. The number of pinholes in the baked coating layer was zero. The surface smoothness of the whole coating layer was graded A. FIG. 2 shows a photograph of the baked coating layer.

Example 2

The plate-like powder "A" obtained in Example 1 and a non-plate-like PEEK powder "b" ("VESTAKEEP 4000UFP-10" manufactured by Daicel-Evonik Ltd., melt viscosity (380° C., shear rate of 36.48 $s^{-1}$): 1800 Pa·s) were mixed in a weight ratio of the former/the latter of 70/30 to give a mixed powder (powder mixture). A dispersion was prepared in the same manner as Example 1 except that the resulting mixed powder was used instead of the plate-like powder "A" in Example 1. In the dispersion, the mixed powder was uniformly dispersed. When the dispersion was allowed to stand, the sedimentation of the mixed powder was not observed.

In the same manner as Example 1, the dispersion was sprayed, and then the resulting coating layer was baked. The number of pinholes in the baked coating layer was 5. The surface smoothness of the whole coating layer was graded B.

Example 3

The plate-like powder "A" obtained in Example 1 and a non-plate-like PEEK powder "c" ("VESTAKEEP 2000UFP-10" manufactured by Daicel-Evonik Ltd., melt viscosity (380° C., shear rate of 36.48 $s^{-1}$): 790 Pa·s) were mixed in a weight ratio of the former/the latter of 80/20 to give a mixed powder (powder mixture). A dispersion was prepared in the same manner as Example 1 except that the resulting mixed powder was used instead of the plate-like powder "A" in Example 1. In the dispersion, the mixed powder was uniformly dispersed. When the dispersion was allowed to stand, the sedimentation of the mixed powder was not observed.

In the same manner as Example 1, the dispersion was sprayed, and then the resulting coating layer was baked. The number of pinholes in the baked coating layer was one. The surface smoothness of the whole coating layer was graded A.

Example 4

The plate-like powder "A" obtained in Example 1 and the non-plate-like PEEK powder "a" were mixed in a weight ratio of the former/the latter of 70/30 to give a mixed powder (powder mixture). A dispersion was prepared in the same manner as Example 1 except that the resulting mixed powder was used instead of the plate-like powder "A" in Example 1. In the dispersion, the mixed powder was uniformly dispersed. When the dispersion was allowed to stand, the sedimentation of the mixed powder was not observed.

In the same manner as Example 1, the dispersion was sprayed, and then the resulting coating layer was baked. The number of pinholes in the baked coating layer was 10. The surface smoothness of the whole coating layer was graded B.

Example 5

The plate-like powder "A" obtained in Example 1 and the non-plate-like PEEK powder "c" were mixed in a weight ratio of the former/the latter of 65/35 to give a mixed powder (powder mixture). A dispersion was prepared in the same manner as Example 1 except that the resulting mixed powder was used instead of the plate-like powder "A" in Example 1. In the dispersion, the mixed powder was uniformly dispersed. When the dispersion was allowed to stand, the sedimentation of the mixed powder was not observed.

In the same manner as Example 1, the dispersion was sprayed, and then the resulting coating layer was baked. The number of pinholes in the baked coating layer was 15. The surface smoothness of the whole coating layer was graded B.

Comparative Example 1

A dispersion was prepared in the same manner as Example 1 except that the non-plate-like PEEK powder "a" was used instead of the plate-like powder in Example 1.

In the same manner as Example 1, the dispersion was sprayed, and then the resulting coating layer was baked. The number of pinholes in the baked coating layer was 250. The surface smoothness of the whole coating layer was graded D.

Figure 3:
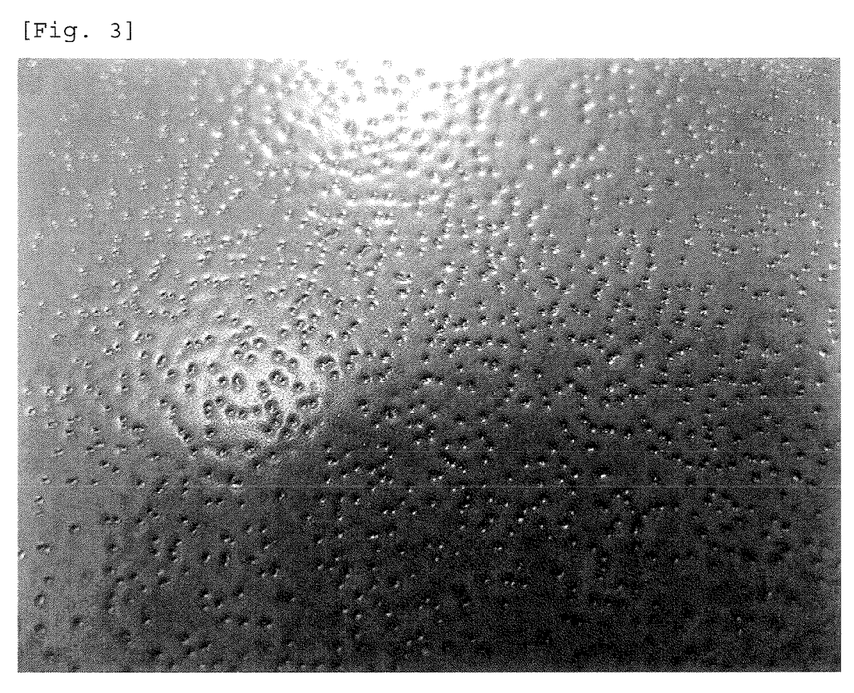
FIG. 3 is a photograph of a coating layer (a baked coating layer) obtained in Comparative Example 1.

FIG. 3 shows a photograph (macrophotograph) of the baked coating layer.

Comparative Example 2

A dispersion was prepared in the same manner as Example 1 except that the non-plate-like PEEK powder "b" was used instead of the plate-like powder in Example 1.

In the same manner as Example 1, the dispersion was sprayed, and then the resulting coating layer was baked. The number of pinholes in the baked coating layer was 88. The surface smoothness of the whole coating layer was graded C.

Comparative Example 3

A dispersion was prepared in the same manner as Example 1 except that the non-plate-like PEEK powder "c" was used instead of the plate-like powder in Example 1.

In the same manner as Example 1, the dispersion was sprayed, and then the resulting coating layer was baked. The number of pinholes in the baked coating layer was 76. The surface smoothness of the whole coating layer was graded C.

Example 6

A plate-like powder "B" was obtained in the same manner as Example 1 except that the non-plate-like PEEK powder "b" was used instead of the non-plate-like PEEK powder "a" in Example 1. The plate-like powder "B" had an average thickness of 1.5 µm, an average diameter of 6.1 µm (i.e., the average thickness/the average diameter=4.1), a diameter distribution of 3.0 to 201.2 µm, a diameter showing the maximum frequency of 15 µm, and a proportion of the powder having a diameter showing the maximum frequency of 7.0%.

In the same manner as Example 1, a dispersion of the resulting plate-like powder "B" was prepared. In the dispersion, the mixed powder was uniformly dispersed. When the dispersion was allowed to stand, the sedimentation of the mixed powder was not observed.

In the same manner as Example 1, the dispersion was sprayed, and then the resulting coating layer was baked. The number of pinholes in the baked coating layer was zero. The surface smoothness of the whole coating layer was graded A.

Example 7

A plate-like powder "C" was obtained in the same manner as Example 1 except that the volume of the media was 1.2 times as large as that of the dispersion [that is, the dispersion/the media (volume ratio)=40/60] in Example 1. The plate-like powder "C" had an average thickness of 0.60 μm, an average diameter of 10.2 μm (i.e., the average thickness/the average diameter=1/17), a diameter distribution of 1.1 to 230.5 μm, a diameter showing the maximum frequency of 25 μm, and a proportion of the powder having a diameter showing the maximum frequency of 5.0%.

In the same manner as Example 1, a dispersion of the resulting plate-like powder "C" was prepared. In the dispersion, the mixed powder was uniformly dispersed. When the dispersion was allowed to stand, the sedimentation of the mixed powder was not observed.

In the same manner as Example 1, the dispersion was sprayed, and then the resulting coating layer was baked. The number of pinholes in the baked coating layer was zero. The surface smoothness of the whole coating layer was graded A.

Example 8

A plate-like powder was obtained in the same manner as Example 1 except that a nonionic surfactant ("Surfynol 485" manufactured by Nissin Chemical Industry Co., Ltd.) was added and dispersed in a proportion of 1% by weight (i.e., in a proportion of 10 parts by weight relative to 100 parts by weight of the PEEK powder) in addition to 10% by weight of the non-plate-like PEEK powder "a" in Example 1. The resulting plate-like powder had the same average thickness or other properties as those of the plate-like powder "A".

In the same manner as Example 1, a dispersion of the resulting plate-like powder was prepared. In the dispersion, the mixed powder was uniformly dispersed. When the dispersion was allowed to stand, the sedimentation of the mixed powder was not observed.

In the same manner as Example 1, the dispersion was sprayed. The uniformity of the coating layer after the spraying was higher than that of the coating layer obtained in Example 1.

After the spraying, the resulting coating layer was baked in the same manner as Example 1. The number of pinholes in the baked coating layer was zero. The surface smoothness of the whole coating layer was graded A.

Example 9

A plate-like powder was obtained in the same manner as Example 1 except that a nonionic surfactant ("Surfynol 485" manufactured by Nissin Chemical Industry Co., Ltd.) was added and dispersed in a proportion of 0.6% by weight (i.e., in a proportion of 6 parts by weight relative to 100 parts by weight of the PEEK powder) in addition to 10% by weight of the non-plate-like PEEK powder "a" in Example 1. The resulting plate-like powder had the same average thickness or other properties as those of the plate-like powder "A".

In the same manner as Example 1, a dispersion of the resulting plate-like powder was prepared. In the dispersion, the mixed powder was uniformly dispersed. When the dispersion was allowed to stand, the sedimentation of the mixed powder was not observed.

In the same manner as Example 1, the dispersion was sprayed. The uniformity of the coating layer after the spraying was higher than that of the coating layer obtained in Example 1.

After the spraying, the resulting coating layer was baked in the same manner as Example 1. The number of pinholes in the baked coating layer was zero. The surface smoothness of the whole coating layer was graded A.

Table 1 shows the resin powders used in Examples and Comparative Examples, and Table 2 shows results of Examples and Comparative Examples. In Table 1, for the non-plate-like powders "a" to "c", the "average thickness" is given as the average value of the major axis, the "average diameter" is given as the average value (average particle diameter) of the major axis and the minor axis.

TABLE 1

|  | Plate-like powder | | | Non-plate-like powder | | |
|---|---|---|---|---|---|---|
| Kind of powder | A | B | C | a | b | c |
| Average thickness (μm) | 0.8 | 1.5 | 0.60 | 27.1 | 16.5 | 13.3 |
| Average diameter (μm) | 8.0 | 6.1 | 10.2 | 24.1 | 11.0 | 12.0 |
| Average diameter/ Average thickness | 10.0 | 4.1 | 17.0 | 0.89 | 0.67 | 0.90 |
| Particle diameter distribution (μm) | 2.2 to 210.0 | 3.0 to 201.2 | 1.1 to 230.5 | 5.4 to 200.0 | 3.5 to 65.0 | 3.5 to 50.0 |
| Mode diameter (μm) | 20 | 15 | 25 | 26 | 12 | 12 |
| Proportion of powder with mode diameter (%) | 6.5 | 7.0 | 5.0 | 15 | 13 | 13.8 |

TABLE 2

|  | Powder (parts by weight) | | | | | | Surfactant (parts by weight) | Number of pinholes | Surface smoothness |
|---|---|---|---|---|---|---|---|---|---|
|  | A | B | C | a | b | c | | | |
| Example 1 | 100 | — | — | — | — | — | — | 0 | A |
| Example 2 | 70 | — | — | — | 30 | — | — | 5 | B |
| Example 3 | 80 | — | — | — | — | 20 | — | 1 | A |
| Example 4 | 70 | — | — | 30 | — | — | — | 10 | B |
| Example 5 | 65 | — | — | — | — | 35 | — | 15 | B |
| Example 6 | — | 100 | — | — | — | — | — | 0 | A |
| Example 7 | — | — | 100 | — | — | — | — | 0 | A |
| Example 8 | 100 | — | — | — | — | — | 10 | 0 | A |
| Example 9 | 100 | — | — | — | — | — | 6 | 0 | A |
| Comparative Example 1 | — | — | — | 100 | — | — | — | 250 | D |
| Comparative Example 2 | — | — | — | — | 100 | — | — | 88 | C |
| Comparative Example 3 | — | — | — | — | — | 100 | — | 76 | C |

INDUSTRIAL APPLICABILITY

The plate-like resin powder of the present invention has a high adhesion to a substrate (base material) although the plate-like resin powder comprises an aromatic polyetherketone resin. Moreover, the plate-like resin powder is coated on the substrate to form a highly smooth coating layer. In particular, even for a coating layer having a small thickness, the generation of pinholes is reduced at a high level. Further, the plate-like powder has an excellent dispersibility in water or the like and a high dispersion stability. Thus the plate-like resin powder of the present invention is useful as a resin powder for a coating material (powder coating), in particular, a coating material for covering (or coating) a metal substrate.

The invention claimed is:

1. A plate-shaped resin powder comprising an aromatic polyetherketone resin and having an average thickness of not more than 2 μm, an average diameter of 7 to 20 μm determined from an electron micrograph, a ratio of the average thickness and an average major axis of 1/3 to 1/50 in the former/the latter determined from an electron micrograph, and a mode diameter of 15 to 30 μm determined by a light-scattering method, wherein a proportion of the resin powder having the mode diameter is 1 to 20% determined by a light-scattering method based on a total amount of the resin powder.

2. The plate-shaped resin powder according to claim 1 wherein the aromatic polyetherketone comprises a polyetheretherketone.

3. The plate-shaped resin powder according to claim 1, wherein the plate-shaped resin powder has a diameter distribution of 1 to 300 μm determined by a light-scattering method and a proportion of the resin powder having the mode diameter of not more than 8% determined by a light-scattering method.

4. The plate-shaped resin powder according to claim 1, wherein the plate-shaped resin powder is obtained by deforming a resin powder comprising an aromatic polyetherketone resin into a plate-shaped form.

5. The plate-shaped resin powder according to claim 1, which is used for a coating material.

6. The plate-shaped resin powder according to claim 1, which is used for a coating material for covering a metal substrate.

7. A coating material comprising a resin powder, wherein the resin powder contains the plate-shaped resin powder recited in claim 1.

8. The coating material according to claim 7, which further comprises a dispersing agent.

9. The coating material according to claim 8, wherein the dispersing agent contains a nonionic surfactant.

10. The coating material according to claim 8, wherein the dispersing agent has a ratio of 0.5 to 30 parts by weight relative to 100 parts by weight of the plate-shaped resin powder.

11. The coating material according to claim 7, wherein the plate-shaped resin powder is dispersed in a dispersion medium containing water.

12. A composite substrate comprising a substrate and a coating layer on the substrate, wherein the coating layer comprises a coating material recited in claim 7.

13. The composite substrate according to claim 12, wherein the substrate comprises a metal substrate.

14. The composite substrate according to claim 12, wherein the coating layer has a thickness of not more than 30 μm.

15. A method for producing a composite substrate recited in claim 12, the method comprising a step of coating a substrate with said coating material.

16. The method according to claim 15, which further comprises a step of baking the coating material after the coating step.

* * * * *